United States Patent
Liang et al.

(10) Patent No.: US 12,124,745 B2
(45) Date of Patent: Oct. 22, 2024

(54) IMAGE FORMATION CONTROL METHOD, DEVICE, AND SYSTEM

(71) Applicant: ZHUHAI PANTUM ELECTRONICS CO., LTD., Guangdong (CN)

(72) Inventors: Zhiqiong Liang, Guangdong (CN); Yinggui Chen, Guangdong (CN)

(73) Assignee: ZHUHAI PANTUM ELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 18/242,239

(22) Filed: Sep. 5, 2023

(65) Prior Publication Data
US 2024/0028270 A1    Jan. 25, 2024

Related U.S. Application Data

(63) Continuation of application No. PCT/CN2022/078944, filed on Mar. 3, 2022.

(30) Foreign Application Priority Data

Mar. 5, 2021   (CN) .................... 202110245790.X

(51) Int. Cl.
G06F 3/12      (2006.01)
(52) U.S. Cl.
CPC .......... G06F 3/1206 (2013.01); G06F 3/1244 (2013.01)
(58) Field of Classification Search
USPC ....................................................... 358/1.15
See application file for complete search history.

(56) References Cited

U.S. PATENT DOCUMENTS

| 2005/0012960 A1 | 1/2005 | Eden et al. |
| 2008/0079996 A1 | 4/2008 | Sasaki |
| 2012/0316950 A1* | 12/2012 | LaPorte ............. G06Q 20/3276 705/14.27 |
| 2014/0327936 A1* | 11/2014 | Busch ................... G06F 3/1292 358/1.15 |
| 2018/0082074 A1* | 3/2018 | Nunes .................. G06F 21/608 |

(Continued)

FOREIGN PATENT DOCUMENTS

| CN | 103218181 A | 7/2013 |
| CN | 107533613   | 1/2018 |
| CN | 107943426 A | 4/2018 |

(Continued)

OTHER PUBLICATIONS

CN 202110245790.X, First Office Action dated Sep. 6, 2023.

(Continued)

*Primary Examiner* — Jacky X Zheng
(74) *Attorney, Agent, or Firm* — Carlson, Gaskey & Olds, P.C.

(57) ABSTRACT

Provided is an image formation control method, device and system. The method includes: acquiring the current operation data, and determining whether the current operation data includes customized data; in response to determining that the current job data comprises custom data, parsing the customized data to generate a parsing result; performing customization processing on the current operation data according to the parsing result using a customization processing module, so as to generate pending job data; and transmitting the pending job data to a target image formation device.

9 Claims, 11 Drawing Sheets

(56) References Cited

U.S. PATENT DOCUMENTS

2020/0285429 A1    9/2020   Bermundo et al.

FOREIGN PATENT DOCUMENTS

| CN | 111026338 A | 4/2020 |
| CN | 111708535 A | 9/2020 |
| CN | 112000302 A | 11/2020 |
| CN | 112988088 A | 6/2021 |

OTHER PUBLICATIONS

International Search Report for International application No. PCT/CN2022/078944 dated May 16, 2022.
CN 202110245790.X, First Office Action dated May 10, 2022.
CN 202110245790.X, Third Office Action dated Apr. 4, 2024.

\* cited by examiner

IMAGE FORMATION CONTROL METHOD, DEVICE, AND SYSTEM

CROSS-REFERENCE TO RELATED APPLICATIONS

The present application is a continuation of International Application No. PCT/CN2022/078944, filed on Mar. 3, 2022, which claims priority to Chinese Patent Application No. 202110245790.X, filed on Mar. 5, 2021, the contents of which are herein incorporated by reference in their entireties.

TECHNICAL FIELD

The present disclosure relates to the field of cloud printing technologies and, in particular, to an image formation control method, device, and system.

BACKGROUND

With the development of Internet technology, the application of cloud services has become increasingly popular. In the field of image formation, the users tend to prefer using such as printing, copying, faxing and the like to cooperate with cloud servers to complete different types of image formation operations, such as Universal Print service provided by Microsoft. When using this service, the users can directly send a document to be printed to the Microsoft cloud server without the need of installing a dedicated driver software corresponding to a cloud printer, the Microsoft cloud server then forwards the document to the cloud printer, so that the cloud printer can directly complete the printing operation.

Cloud printing of Universal Print has functions including capability of automatically building security groups for cloud printers to access, rich management experience for IT departments, etc. As a result, all user terminals are free from dedicated driver software corresponding to the cloud printer, and there is no need to spend time and effort to build a local shared environment for the cloud printer. Enterprise and organization administrators can provide cloud printers in the backend, review resource details, and manage which users can access and use the printers, etc. Therefore, the configuration can be simplified. On the one hand, the operation and maintenance pressure of the IT department can be greatly reduced and, on the other hand, the complicated process of printer networking will be avoided.

However, Universal Print cannot use the special functions of cloud printers, thereby failing to realize user-defined special printing functions. Therefore, Universal Print has certain limitations in this regard.

SUMMARY

In view of this, the present disclosure proposes an image formation control method, device and system, which can enrich the image formation functions of the image formation device, satisfy user-defined special printing, and improve the compatibility of the image formation device.

The present disclosure provides an image formation control method including the following steps: acquiring current job data, and determining whether the current job data comprises custom data; in response to determining that the current job data comprises custom data, parsing the custom job data to generate a parsing result; performing, by a custom processing module and according to the parsing result, custom processing on the current job data to generate pending job data, wherein the custom processing comprises at least one of encryption processing, encoding processing, preset format conversion processing or adding preset instruction parameter processing; and transmitting the pending job data to a target image formation device. The custom processing includes at least one of encryption processing, encoding processing, preset format conversion processing and adding preset instruction parameter processing.

In an embodiment, the method further includes: acquiring information of the target image formation device. The transmitting the pending job data to the target image formation device includes: transmitting the pending job data to the target image formation device corresponding to the information of the target image formation device.

In an embodiment, the method further includes: in response to determining that the current job data does not comprises custom data, processing, by a universal print module, the current job data to generate the pending job data.

In an embodiment, the method further includes: registering a custom processing module. The registering the custom processing module includes the following steps: acquiring at least one of a custom processing application software package or a custom processing link; and registering the custom processing module based on the custom processing application software package or the custom processing link.

In an embodiment, the method further includes: before the acquiring at least one of the custom processing application software package or the custom processing link; sending a registration request for the custom processing module; receiving response information of the registration request for the custom processing module, and displaying a first control based on the response information. The first control includes at least one information of a registration link or an application software package of the custom processing module.

The present disclosure further provides an image formation control device, including: an acquisition unit configured to acquire current job data; a determination unit configured to determining whether the current job data comprises custom data; a parsing unit configured to parse the custom data to generate a parsing result when the determination unit determines that the current job data comprises custom data; a custom processing unit configured to perform custom processing on the current job data according to the parsing result to generate pending job data, wherein the custom processing comprises at least one of encryption processing, encoding processing, preset format conversion processing or adding preset instruction parameter processing; and a transmission unit configured to transmit the pending job data to a target image formation device. The custom processing includes at least one of encryption processing, encoding processing, preset format conversion processing and adding preset instruction parameter processing.

In an embodiment, the device further includes a registering unit configured to register a custom processing module. The registering the custom processing module includes the following steps: acquiring at least one of a custom processing application software package or a custom processing link; and registering the custom processing module based on the custom processing application software package or the custom processing link.

The present disclosure further provides an image formation control system including a cloud server platform. The cloud server platform includes a first server, and the first server includes a universal print module, a custom processing module and a communication module. The first server is configured to acquire current job data and determine whether the current job data includes custom data. The custom processing module is configured to parse the custom data to generate a parsing result when the current job data includes the custom data. The custom processing module is further configured to perform custom processing on the current job data according to the parsing result. The custom processing includes at least one of encryption processing, encoding processing, preset format conversion processing or adding preset instruction parameter processing. The first server is configured to generate pending job data based on the custom-processed job data. The communication module is configured to transmit the pending job data to a target image formation device.

The present disclosure further provides an image formation control system including a cloud server platform. The cloud server platform includes a first server and a second server, the first server includes a universal print module and a communication module, and the second server includes a custom processing module. The universal print module or the custom processing module is configured to acquire current job data and determine whether the current job data includes custom data. The custom processing module is configured to parse the custom data to generate a parsing result when the current job data includes the custom data. The custom processing module is further configured to perform custom processing on the current job data according to the parsing result. The custom processing includes at least one of encryption processing, encoding processing, preset format conversion processing or adding preset instruction parameter processing. The custom processing module is further configured to generate pending job data based on the custom-processed job data. The communication module is configured to transmit the pending job data to a target image formation device.

In an embodiment, the first server further includes a control module configured to acquire information of the target image formation device, and transmit the pending job data to the image formation device corresponding to information of the target image formation device.

In an embodiment, the universal print module is further configured to process the current job data to generate the pending job data when the current job data does not comprise the custom data.

In an embodiment, the device further includes a terminal device. The terminal device is configured to acquire at least one of a custom processing application software package or a custom processing link, and to register the custom processing module based on the custom processing application software package or the custom processing link.

The present disclosure further provides a registering method for a custom processing module, including the following steps: sending a registration request for the custom processing module; receiving response information of the registration request for the custom processing module, and displaying a first control based on the response information, wherein the first control comprises at least one information of a registration link or an application software package of the custom processing module; and acquiring an operation instruction, displaying a second control based on the operation instruction, wherein the second control comprises a custom processing option, and the custom processing option comprises at least one processing option of encryption processing, encoding processing, preset format conversion processing, or adding preset instruction parameter processing.

The present disclosure further provides an electronic device including a memory, a processor and a computer program. The computer program is stored in the memory, and is configured to be executed by the processor to implement the above mentioned methods.

The present disclosure further provides a computer-readable storage medium, on which a computer program is stored. When executed, the program implements the steps of the above mentioned methods.

The technical solutions of the present disclosure have at least the following beneficial effects.

By acquiring the current job data and determining whether the current job data includes custom data. When the current job data includes custom data, the custom data is parsed to generate a parsing result. The current job data is custom-processed according to the parsing result to generate pending job data. The pending job data is transmitted to the target image formation device, in such a manner that the image formation device can customize the image formation function of the pending job data, enrich the image formation function of the image formation device, satisfy the user-defined special printing, and improve the compatibility of the image formation device.

BRIEF DESCRIPTION OF DRAWINGS

In order to better illustrate the technical solution of the embodiments of the present disclosure, the drawings required in the embodiments will be briefly introduced herein. It is appreciated that, the drawings described below are only some embodiments of the present disclosure. For an ordinary person skilled in the art, other drawings can also be obtained based on these drawings without any creative effort.

DESCRIPTION OF EMBODIMENTS

In order to facilitate understanding of the present disclosure, the present disclosure will be described below with reference to related drawings. Preferred embodiments of the present disclosure are shown in the accompanying drawings. However, the present disclosure can be implemented in many different forms, but not limited to the implementations described herein. It is appreciated that, the purpose of providing these embodiments is to make the disclosure of the present disclosure more thorough and comprehensive.

Unless otherwise defined, all technical and scientific terms used herein have the same meaning as commonly understood by an ordinary person skilled in the art of the present disclosure. The terminology used herein in the specification of the present disclosure is only for the purpose of describing specific implementations, but not intended to limit the present disclosure.

Figure 1:
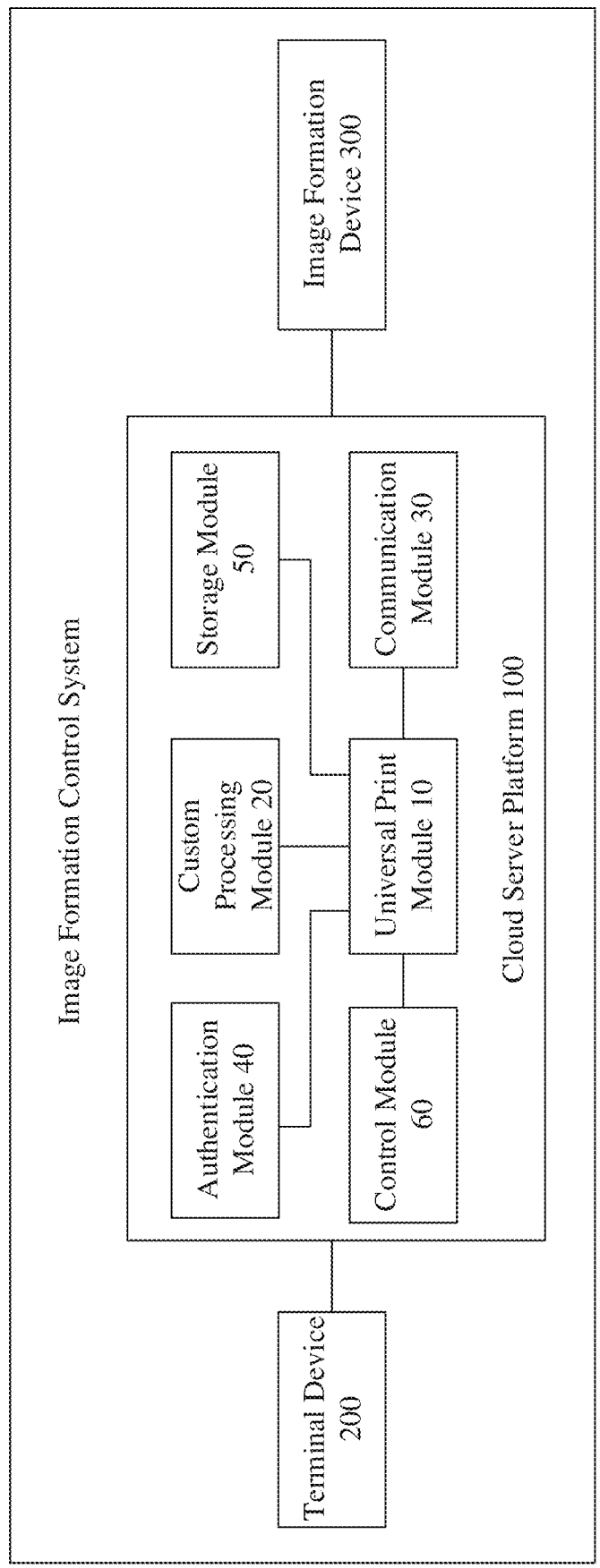
FIG. 1 is a schematic structural diagram of an image formation control system according to an embodiment of the present disclosure.

As shown in FIG. 1, an image formation control system is provided in an embodiment of the present disclosure, and the image formation control system includes a cloud server platform 100, a terminal device 200 and an image formation device 300.

The cloud server platform 100 includes a universal print module 10, a custom processing module 20, a communication module 30, an authentication module 40, a storage module 50 and a control module 60. The universal print module 10, the custom processing module the communication module 30, the authentication module 40, the storage module 50 and the control module 60 can be provided in the same server. Alternatively, a part of the universal print module 10, the custom processing module 20, the communication module 30, the authentication module 40, the storage module 50 and the control module 60 are provided in one server, and the other part of the modules are provided in another server.

The terminal device 200 includes a first terminal device and a second terminal device. The terminal device 200 may be, but not limited, to a mobile phone, a tablet, a handheld, a computer, and the like.

The image formation device 300 is configured to perform imaging processing operations, and the image formation device 300 includes, but not limited to, a printer, a copier, a scanner, a fax machine or a multifunctional machine that combines the above functions.

The functions of each of the modules, the terminal device and the image formation device of the cloud server platform will be described below in conjunction with specific embodiments.

Figure 2:
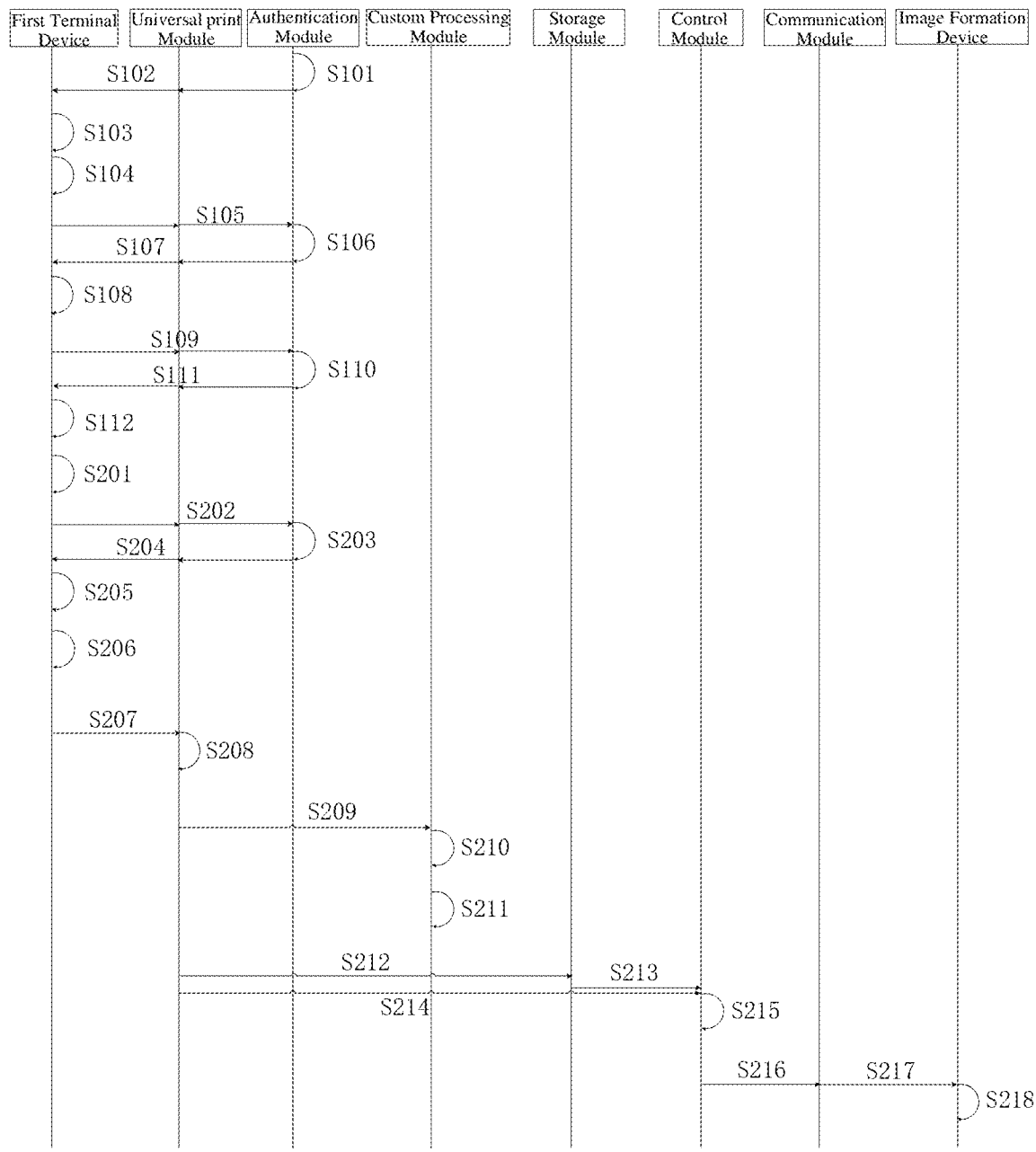
FIG. 2 is a schematic flowchart of an image formation device sharing method and an image formation control method according to an embodiment of the present disclosure.

As shown in FIG. 2, an embodiment of the present disclosure provides an image formation device sharing method. In this embodiment, the universal print module, the custom processing module, the communication module, the authentication module, the storage module and the control module are provided in the first server.

The method for associating a first user with a cloud server platform and sharing an image formation device includes the following steps.

S101. Generating authority information based on a license protocol.

The license protocol may be a purchase agreement or a lease agreement. The authority information includes first user authority information, second user authority information, image formation device authority information and user organization relationship information. The first user authority information may include a first user account and a password corresponding to the first user account, and the first user may be an administrator. The second user authority information may include a second user account and a password corresponding to the second user account, and the second user may be an ordinary user, that is, a non-administrator. The user organization relationship information may be the institution, the organization, the region, the corresponding administrator, etc., to which the user belongs. The server may be, for example, a Microsoft cloud server. After a user (a company or an organization) purchases or leases a cloud service from the Microsoft cloud service, the authentication module can generate authority information based on the license protocol.

S102. Sending the first user authority information to the first terminal device.

The first user authority information may include administrator authority and/or administrator authentication information. The authentication module can directly send the first user authority information to the first terminal device. Further, the authentication module can also send the first user authority information to the universal print module, and then the universal print module will send the first user authority information to the first terminal device. The administrator acquires administrator authority and/or administrator authentication information through a display interface of the first terminal device. It shall be understood that, the cloud server platform can also send the first user authority information to the first terminal device through an E-mail, a text message or the like. Alternatively, the administrator directly acquires the first user authority information from the cloud server platform.

S103. Accessing the cloud server platform website.

The cloud server platform website can be sent directly to the first terminal device through the authentication module, or can be sent to the universal print module through the authentication module and then sent to the first terminal device through the universal print module. The cloud server platform website can be sent to the first terminal device together with the first user authority information, and the first terminal device accesses the cloud server platform website. It shall be understood that, the cloud server platform can also send the cloud server platform website to the first terminal device through an E-mail, a text message or the like. Alternatively, the administrator directly acquires the cloud server platform website from the cloud server platform.

S104. Receiving first user authority information.

When the first terminal device is a computer, the first terminal device can receive the first user authority information input by the administrator through the keyboard. When the first terminal device is a mobile phone, the first terminal device can acquire the first user authority information by scanning.

The administrator can also send a request for acquiring the first user authority information to the cloud server platform through the first terminal device, the cloud server platform will inform the administrator of the first user authority information through the first terminal device or the like, and the administrator will input the first user authority information on the interface from which the first terminal device accesses the cloud server platform website.

S105. Sending the first user authority information to the authentication module.

It can be understood that the first terminal device may directly send the first user authority information to the authentication module, or may send the first user authority information to the authentication module through the universal print module.

S106. Verifying the first user authority information.

The first user authority information can be compared with the preset first user authority information by the authentication module, and the first user authority information can also be compared with the preset first user authority information by the universal print module to verify whether the first user authority information matches the preset first user authority information.

S107. Sending the first user authority information and the associated image formation device information thereof to the first terminal device.

The image formation device uses the registration interface provided by the cloud server platform, and is responsible, after registered to the cloud server platform, for providing cloud printing services for the user accounts associated (bound) to itself in the system. The image formation device usually uses the registration interface provided by the cloud server platform to register through the HTTPS protocol using the corresponding product ID and the previously applied registration key. After the registration is completed, the cloud server platform will assign an access account and an access key to the image formation device. The image formation device logs in to the cloud server platform using the access account and the access key, and the cloud server platform acquires the image formation device information. The image formation device information may include characteristic information of the image formation device, such as MAC address and serial number, and at least one type of information representative of the institution to which the image formation device belongs, such as the institution, the organization, the region, the corresponding administrator. Then, the characteristic information of the image formation device is correlated with the information representative of the institution to which the image formation device belongs, for example, the image formation device information is associated with the administrator authority.

It is possible to facilitate the administrator to conduct unified management and control of image formation devices by associating image formation device information with administrator authority. For example, it can be quickly known how many image formation devices correspond to the institution to which the image formation devices belong, such that the operation information of the image formation device can be subsequently traced back according to the institution to which the image formation devices belong. It can also be quickly known how many image formation devices are associated with the current enterprise, so as to control expenses based on the quantity of image formation devices. It is also possible that only users of the enterprise to which the image formation devices belong are allowed to use the corresponding image formation devices. The specific way of associating the image formation device information with the administrator authority may be in a form of a storage table, individually storing the image formation device information and the administrator authority, or in a form that the administrator authority is used as a table header, and then all the image formation devices corresponding to the administrator authority are stored in a table, or in other forms instead of the table, of course, such as folder management, or software code recording. As long as the image formation device information is inputted in the cloud server platform, the administrator authority can be quickly acquired. Alternatively, after the administrator authority is inputted, the image formation device information will be quickly acquired. The specific form thereof is not limited in the present disclosure.

When the first user authority information is verified by the authentication module, the authentication module feeds the first user authority information and the associated image formation device information thereof back to the first terminal device through the universal print module. When the first user authority information is verified by the universal print module, the universal print module feeds the first user authority information and the associated image formation device information thereof back to the first terminal device. It shall be understood that, the cloud server platform can also send the first user authority information and the associated image formation device information thereof to the first terminal device through an E-mail, a text message or the like. Alternatively, the administrator can acquire the first user authority information and the associated image formation device information thereof directly from the cloud server platform.

S108. Sharing the image formation device with the second user account.

The administrator can set whether to share the image formation device or not and the sharing scope on the management page of the image formation device or the administrator information property page of the first terminal device. The sharing level refers to which ones of the second users are shared, that is, which second users can use the image formation device.

S109. Sending the image formation device and the second user account with which the image formation device is shared to the authentication module.

The first terminal device may directly send the image formation device and the second user account with which the image formation device is shared to the authentication module, or may send the image formation device and the second user account with which the image formation device is shared to the authentication module through the universal print module.

S110. Associating the image formation device with the second user account with which the image formation device is shared.

The image formation device is associated with the second user account that can use the image formation device. The way of association may be in a form of a storage table, folder management, software code recording, etc., which will not be repeated here. The image formation device is associated with the second user account with which the image formation device is shared to obtain the sharing result. When image formation device is successfully associated with the second user account with which the image formation device is shared, the sharing result is: the image formation device and the associated second user account thereof. When image formation device fails to be associated with the second user account with which the image formation device is shared, the sharing result is: association failed.

S111. Sending the sharing result to the first terminal device.

The authentication module can directly send the sharing result to the first terminal device, or send the sharing result to the first terminal device through the universal print module.

S112. Displaying the sharing result.

The first terminal device displays the sharing result. The cloud server platform can also feed the sharing result back to the second user being shared with. When the second user being shared with logs in to the account, the image formation device information associated therewith can be displayed. It shall be understood that, the cloud server platform can also inform the second user, the second user account being shared with and the image formation device associated therewith in other ways such as an Email or a text message.

In addition, when the universal print module, custom processing module, communication module, authentication module, storage module and control module are provided in different servers, the steps of associating the first user with the cloud server platform and the sharing method of the image formation device can be consistent with the steps S101 to S112.

As shown in FIG. 2, an embodiment of the present disclosure further provides an image formation control method. In this embodiment, universal print module, custom processing module, communication module, authentication module, storage module and control module are provided in the first server. The image formation control method includes the following steps.

S201. Receiving second user authority information.

The second user authority information may be received from the authentication module by the second terminal device. It shall be understood that, the second user authority information may also be received from the authentication module by the first terminal device, and the first terminal device and the second terminal device may be the same terminal device.

The second user authority information may include the second user account, the corresponding password thereof, the account validity period, and the account authority.

The second user authority information may be sent to the second terminal device by the cloud server platform. Alternatively, the second user can send a request for acquiring the second user authority information to the cloud server platform by the second terminal device, and the cloud server platform will inform the second user of the second user authority information by the second terminal device, such as an E-mail or a text message.

The second user inputs the second user authority information on the second terminal device, such that the second terminal device receives the second user authority information.

S202. Sending the second user authority information to the authentication module.

The second terminal device may directly send the second user authority information to the authentication module, or may send the second user authority information to the authentication module through the universal print module.

S203. Determining an image formation device associated with the second user account.

The authentication module determines the image formation device and the second user account associated therewith according to the step S110 of the above embodiment, such that the image formation device associated with the second user account can be determined by the second user account.

S204. Sending the image formation device associated with the second user account to the second terminal device.

The authentication module may directly send the image formation device associated with the second user account to the second terminal device, or may send the image formation device associated with the second user account to the second terminal device through the universal print module.

S205. Displaying the image formation device associated with the second user account.

For example, when the application software corresponding to Microsoft Office 365 of the second terminal device performs printing operation or device search, the image formation device associated with the second user account is displayed.

S206. Determining the target image formation device from the image formation device associated with the second user account.

When a printing job is required, the second user may select one or more image formation devices from the image formation devices associated with the second user account on the second terminal device as the target image formation device, and perform an imaging operation through the target image formation device.

S207. Sending current job data and target image formation device information to the universal print module.

The current job data and the target image formation device information can be sent to the universal print module by the second terminal device, or the current job data and target image formation device information can be sent to the custom processing module by the second terminal device through the universal print module.

S208. Parsing the current job data and determining whether the current job data includes custom data.

Parsing the current job data and determining whether the current job data includes custom data can be executed by the universal print module, or by the second terminal device, or by the custom processing module. Alternatively, the second terminal device first sends the current job data to the target image formation device or the universal print connector corresponding to the target image formation device information. When the target image formation device or the universal print connector cannot process the current job data, the target image formation device or the universal print connector will forward the current job data to the custom processing module.

The custom data may be a preset character or a preset field corresponding to a custom function.

S209. Sending the current job data to the custom processing module when the current job data includes the custom data.

S210. Parsing the custom data to generate parsing result.

When the universal print module parses the current job data and determines that the current job data includes the custom data, the current job data is transmitted to the custom processing module, and the custom processing module parses the custom data to generate parsing result. When the custom processing module parses the current job data and determines that the current job data includes the custom data, the custom data is parsed to generate parsing result.

S211. Performing custom processing on the current job data according to the parsing result to generate pending job data.

The custom processing module determines what kind of custom processing should be performed on the current job data according to the parsing result resulted from parsing the custom data, such that the target image formation device can perform the custom image formation operation.

The custom processing includes at least one of encryption processing, encoding processing, preset format conversion processing, and adding preset instruction parameter processing.

The encryption processing is performed on current job data using common encryption methods in the prior art, such as Advanced Encryption Standard (AES) algorithm, DAta Encryption Standard (DES) algorithm, and Rivest-Shamir-Adleman (RSA) algorithm, such that the security of pending job data transmitted to the image formation device can be enhanced.

In the custom processing, the current job data is encoded and compressed using common compression methods in the prior art, such as the Joint Bi-level Image experts Group (JBIG) compression method, such that on the one hand, the storage space of the pending job data can be reduced, and on the other hand, the transmission time of transmitting the pending job data from the cloud server platform to the image formation device.

The custom processing can convert the format of the current job data using the preset format conversion, so as to facilitate processing the pending job data by the image formation device. The preset format conversion may be different from the format conversion of the existing universal print module. Therefore, the custom processing module can provide more format conversions for the current job data, for example, conversion to PDF, PWG, URF, etc., or other data formats that the general modules do not have.

The adding preset instruction parameter processing can add preset instruction parameters at the head, the tail or other positions of current job data, and the image formation device can use the preset instruction parameters to count or mark the usage authority of the user information, the issuing time and the number of pages to be printed of issuing the pending job data.

S212. Transmitting the current job data to the storage module and taking the current job data as the pending job data when the current job data does not include the custom data.

S213. Transmitting the pending job data to the control module.

When the current job data includes the custom data, the custom processing module transmits the pending job data directly to the control module, or transmits it to the control module through the storage module. When the current job data does not include the custom data, the storage module transmits the pending job data to the control module.

S214. Acquiring target image formation device information.

The control module can acquire the target image formation device information from the universal print module, and determine to transmit the pending job data to the corresponding target image formation device according to the target image formation device information. In other words, the control module is configured to control the transmission path of pending job data.

S215. Determining the transmission path according to the image formation device information and the job information.

The control module determines the transmission path, according to the acquired pending job data processed by the universal print module or custom processing module, and the corresponding target image forming device information, such as the specific image formation device, the job completion time, and the number of copies.

S216. Transmitting the pending job data to the communication module.

Under the condition that the control module has determined the transmission path according to the target image formation device information and the pending job data, the pending job data is transmitted to the communication module. The communication module is communicatively connected to the image formation device, and the communication module has communication ports individually corresponding to the image formation device. Therefore, the pending job data can be transmitted to the corresponding image formation device through the communication module.

S217. Transmitting the pending job data to the target image formation device.

Transmitting the pending job data to the target image formation device specifically includes: transmitting the pending job data to the target image formation device corresponding to the target image formation device information.

The communication module can acquire the target image formation device corresponding to the target image formation device information from the control module, so as to transmit the pending job data to the target image formation device.

The control module can further transmit additional job information to the communication module, and the communication module transmits the additional job information together with the pending job data to the target image formation device. The additional job information can be used to indicate the number of copies of the pending job data, the image formation time of the pending job data, and the like.

S218. Parsing the printing job, and performing printing.

The target image formation device parses the acquired pending job data, and performs printing operation. The image formation device performs the parsing process of the corresponding custom function according to the custom processing performed by the custom processing module. For example, if the job data is encrypted by the custom processing module, the image formation device first decrypts the pending job data after receiving the pending job data, and then performs printing operation. Similarly, the encoded and compressed pending job data is decompressed and so on.

In the present disclosure, the universal print module, the custom processing module, the communication module, the authentication module, the storage module and the control module are provided in the same server, such that the job data can be processed in the same server, avoiding the job data being transmitted between different servers, such that errors during the transmission of the job data between different servers can be avoided, and the security of the job data can be improved by preventing the job data from being stolen during transmission between different servers.

Figure 3:
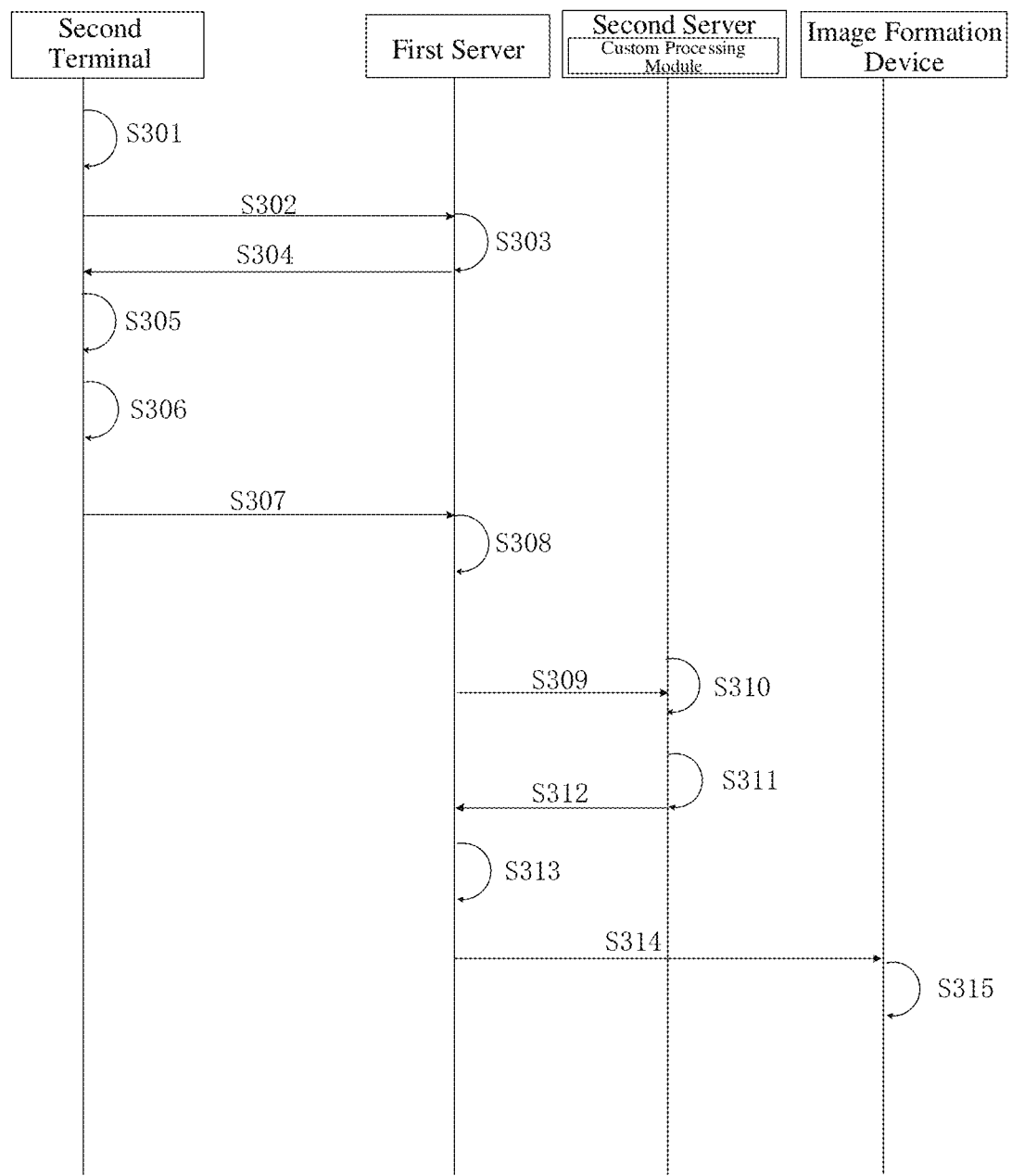
FIG. 3 is a schematic flowchart of an image formation control method according to another embodiment of the present disclosure.

As shown in FIG. 3, an embodiment of the present disclosure further provides another image formation control method. In this embodiment, the universal print module, communication module, authentication module, storage module and control module are provided in the first server, such as Microsoft Cloud server, and the custom processing module is provided in the second server, such as the manufacturer server of the image formation device. As illustrated in the above embodiment, the steps of associating the first user (the first terminal device/the administrator user) with the cloud server platform and the sharing method of the image formation device can be consistent with the steps S101 to S112. The image formation control method corresponding to the user being shared/the second terminal device includes the following steps.

S301. Inputting second user authority information.

The Microsoft cloud server first generates authority information based on the license protocol. The authority information includes first user authority information, second user authority information, image formation device information, and user organization information. The first user authority information may include a first user account and a corresponding password, and the first user may be an administrator. The second user authority information may include a second user account and a corresponding password, and the second user may be an ordinary user, that is, a non-administrator. The user organization information may be the institution, the organization, the region, the corresponding administrator, or the like, to which the user belongs. The Microsoft cloud server can send the authority information to the second terminal device. The second user authority information may include the second user account, the corresponding password thereof, the account validity period, and the account authority.

The second user authority information may be sent to the second terminal device by the Microsoft cloud server. Alternatively, the second user may send a request for acquiring the second user authority information to the Microsoft cloud server through the second terminal device, and the Microsoft cloud server will inform the second user of the second user authority information through the second terminal device or other means.

The second user inputs second user authority information on the second terminal device, such that the second terminal device receives the second user authority information.

S302. Sending the second user authority information to the first server.

S303. Parsing the second user authority information to determine an image formation device associated with the second user account.

This step may include: the authentication module parses the second user authority information to determine the image formation device associated with the second user account.

S304. Sending the image formation device associated with the second user account to the second terminal device.

The authentication module of the first server sends the image formation device information associated with the second user account to the second terminal device.

S305. Displaying the image formation device associated with the second user account.

For example, when the application software corresponding to Microsoft Office 365 of the second terminal device performs printing operation or device search, the image formation device associated with the second user account is displayed.

S306. Determining the target image formation device from the image formation device associated with the second user account.

When a printing job is required, the second user can select one or more image formation devices from the image formation devices associated with the second user account on the second terminal device as the target image formation device, and perform imaging operations by the target image formation device.

S307. Sending the current job data and the target image formation device information to the first server.

The second terminal device may send the current job data and the target image formation device information to the universal print module of the first server, or the second terminal device may send the current job data and the target image formation device information to the second server through the first server.

S308. Parsing the current job data and determining whether the current job data includes custom data.

Parsing the current job data and determining whether the current job data includes the custom data that can be executed by the universal print module of the first server, or by the second terminal device, or by the custom processing module of the second server. Alternatively, the second terminal device first sends the current job data to the target image formation device or universal print connector corresponding to the target image formation device information, and when the target image formation device or the universal print connector cannot process the current job data, the target image formation device or the universal print connector forwards the current job data to the custom processing module.

The custom data may be a preset character or a preset field corresponding to a custom function.

S309. Sending the current job data to the second server when the current job data includes the custom data.

S310. Parsing the custom data to generate parsing result.

When the custom processing module of the second server parses the current job and determines that the current job data includes the custom data, the custom data is parsed to generate parsing result. Alternatively, when the universal print module of the first server parses the current job data and determines that the current job data includes the custom data, the control module acquires the current job data from the universal print module, and transmits the current job data to the communication module, and then the communication module transmits the data to the custom processing module of the second server, and finally the custom processing module parses the custom data to generate the parsing result.

S311. Performing custom processing on the current job data according to the parsing result to generate pending job data.

The custom processing module determines what kind of custom processing should be performed on the current job data according to the parsing result obtained by parsing the custom data, such that the target image formation device can perform the custom image formation operation.

S312. Transmitting the pending job data to the first server.

The custom processing module of the second server transmits the pending job data to the communication module of the first server.

S313. Taking the current job data as the pending job data when the current job data does not include custom data.

When the universal print module of the first server parses the current job data and determines that the current job data does not include the custom data, the current job data is used as the pending job data. Alternatively, when the custom processing module of the second server parses the current job data and determines that the current job data does not include custom data, the current job data is sent to the first server as the pending job data.

S314. Transmitting the pending job data to the target image formation device.

Transmitting the pending job data to the target image formation device specifically includes: transmitting the pending job data to the target image formation device corresponding to the target image formation device information.

The first server acquires the target image formation device corresponding to the target image formation device information, so as to transmit the pending job data to the target image formation device.

S315. Parsing the print job, and performing printing.

The target image formation device parses the acquired pending job data, and performs printing operation. The image formation device performs the parsing process of the corresponding custom function according to the custom processing performed through the custom processing module. For example, if the job data is encrypted through the custom processing module, the image formation device firstly decrypts the pending job data after receiving the same, and then performs printing operation. Similarly, the printing operation is performed after decompressing the encoded and compressed pending job data.

In the present disclosure, the universal print module, the communication module, the authentication module, the storage module and the control module are provided in the first server, the custom processing module is provided in the second server which may be an image formation device manufacturer server, such that on the one hand, it is not required to purchase the usage right to use the image formation device, thereby reducing costs, and on the other hand, the custom image formation function of the image formation device can be used, which is convenient for technicians to maintain during use.

Figure 4:
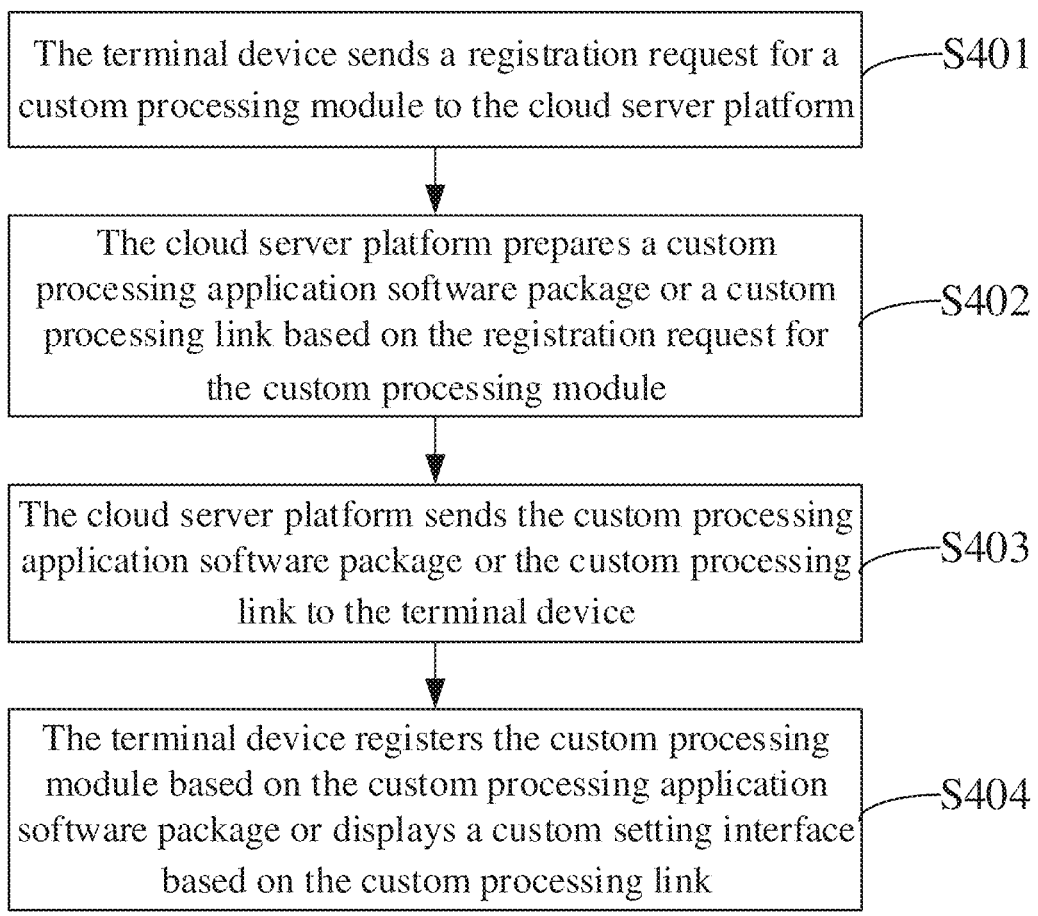
FIG. 4 is a schematic flowchart of a registering method for a custom processing module by a terminal device according to an embodiment of the present disclosure.

As shown in FIG. 4, the method for terminal device to register custom processing module is as follows.

S401. The terminal device sends a registration request for a custom processing module to the cloud server platform.

S402. The cloud server platform prepares a custom processing application software package or a custom processing link based on the registration request for the custom processing module.

S403. The cloud server platform sends the custom processing application software package or the custom processing link to the terminal device.

S404. The terminal device registers the custom processing module based on the custom processing application software package or displays a custom setting interface based on the custom processing link.

Further, as shown in FIG. 1, the image formation device 300 can be a Universal compatible printer, the image formation device 300 comes with a module connected to the cloud server platform, for example, a built-in network address and a support for Standard IPP Infrastructure protocol. The image formation device 300 can be automatically linked to the communication module of the cloud server platform after powered up, or can be linked to the communication module of the cloud server platform subsequent to the user manually operating a predetermined button after powered up.

The image formation device 300 may also be an ordinary printer. It is required to install a software, a Universal printer connector, on a computer connected (via network, USB, Wi-Fi, etc.) to the image formation device 300 for the ordinary printer, and the software is configured with a network address information and a support for Standard IPP Infrastructure protocol. The ordinary printer is linked to the communication module of the cloud server platform via the Universal printer connector.

The image formation device 300 is a universal compatible printer, the registration process of the image formation device 300 will be described.

The user inputs the product ID and the previously applied registration key to the universal compatible printer, the universal print connector sends the product ID and registration key to the communication module of the cloud server platform, the communication module transmits the product ID and the registration key to the authentication module, and the authentication module verifies the product ID and the registration. After the verification is succeeded, the cloud server platform assigns an access account and an access key to the universally compatible printer. The universally compatible printer uses the access account and access key to log in to the cloud server platform. The cloud server platform acquires and stores the information of the universally compatible printer, so as to implement the registration of universally compatible printers.

Figure 5A:
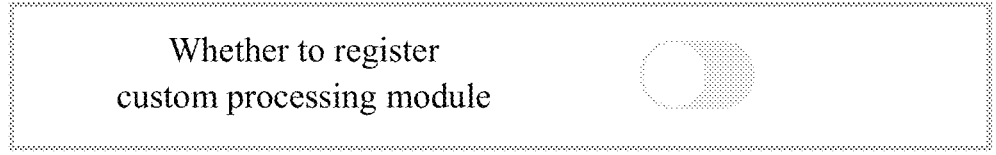
FIGS. 5A-5C are schematic diagrams of a display interface of a terminal device registering a custom processing module according to an embodiment of the present disclosure.
Figure 5B:
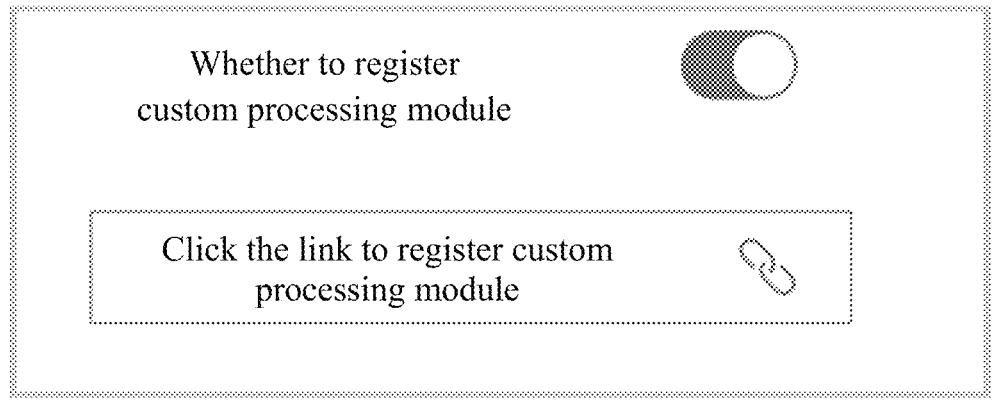
Figure 5C:
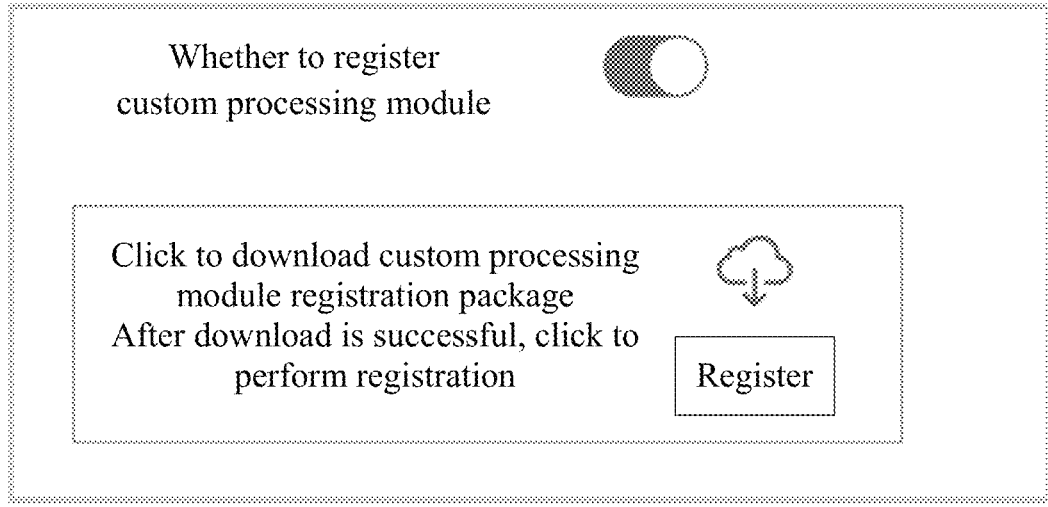

FIGS. 5A-5C are schematic diagrams of display interfaces for registering a custom processing module using a terminal device. Users can realize the registration of custom processing module based on this interface, which is specifically as follows:

(1) The terminal device operation interface provides a control of "whether to register a custom processing module", FIG. 5A shows that the control is in the unselected state, and FIGS. 5B and 5C shows the control is in the selected state.

(2) As shown in FIG. 5B, when expecting to register the custom processing module through the link, the user can click the link of the custom processing module in FIG. 5B to perform the registration.

(3) When expecting to register through the custom processing module registration package, as shown in FIG. 5C, the user can click to download the custom processing module registration package in FIG. 5C. After the module is successfully downloaded, the custom processing module is registered by clicking a control of "performing registration".

As mentioned above, the control of "whether to register a custom processing module" provided by the terminal device shown in FIG. 5A may be a control displayed independently, or a control displayed in the same control combined with other information or other controls, or a control displayed in the same interface combined with other information or other controls to display. When expecting to register a custom processing module, the user can click to enable "Whether to register a custom processing module" to display the method of registering a custom processing module correspondingly, such as "click the link to register a custom processing module", "click to download the custom processing module registration package to perform registration", and the like. As mentioned above, FIGS. 5B and 5C may be two controls displayed separately, or the same control displayed together.

That is, based on the above schematic diagram of the display interface, when the user expects to use custom processing, the registration of the custom processing module can be started to perform by selecting enabling to register the custom processing module. When the user selects enabling to register the custom processing module, it means that the user expects to register the custom processing module to perform custom processing on related documents. When the user selects enabling to register the custom processing module, the user is prompted to "click the link to register a custom processing module", or "click to download a custom processing module registration package, and after the module is successfully downloaded, click to perform the registration" to realize the registration of custom processing module based on the above display interface. It can be understood that the custom processing module can be registered in the terminal device using the above registration steps, and the custom processing module can also be registered in the cloud server using the terminal device. In an example, the custom processing module is registered in the cloud server using the terminal device by the above registration procedures. When the user expects to perform custom processing, the job data and the custom data indicating custom processing are sent to the cloud server, and the cloud service performs the corresponding custom processing on the job data after receiving the job data and the custom data thereof.

Figure 6:
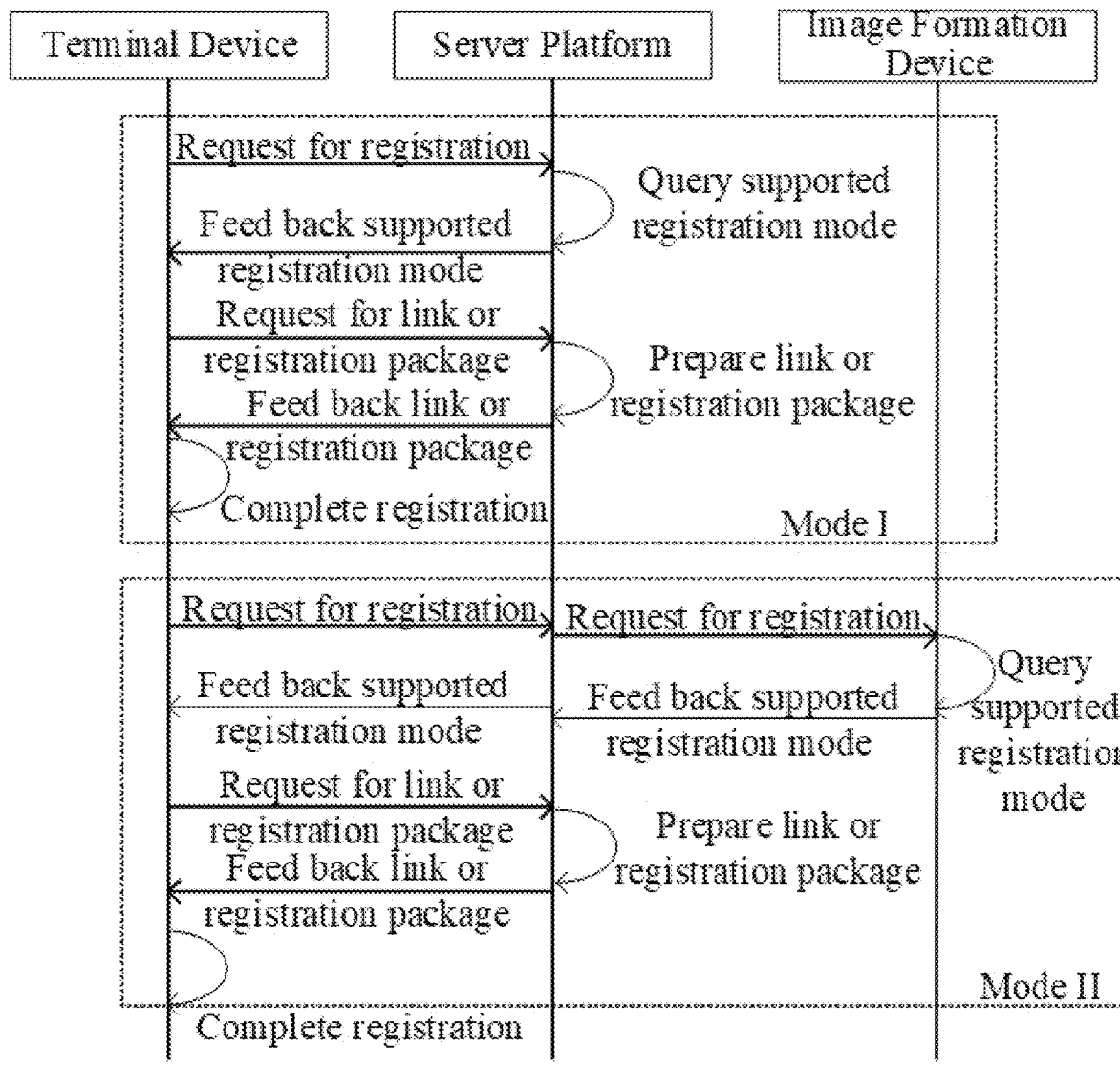
FIG. 6 are schematic flowchart of two registration modes according to an embodiment of the present disclosure.

In an embodiment, as shown in FIG. 6, when expecting to register a custom processing module, the user clicks to determine registering the custom processing module, as shown in FIG. 5A. A registration request for the custom processing module is sent to the cloud server platform, and the cloud server platform queries the registration mode supported by the corresponding image formation device or the corresponding terminal device based on the registration request, the supported registration mode is fed back to the terminal device, and the interface, as shown in FIG. or 5C, displayed on the terminal device prompts the user the supported registration mode. When the link registration is supported, as shown in FIG. 5B, the user is prompted that supported registration is a link, and the custom processing module can be registered by clicking the link. When the user clicks the link, the registration link is requested from the cloud server platform, and the cloud server platform prepares the registration link based on the link registration request, and feeds it back to the terminal device to complete the registration of the custom processing module. Alternatively, when the application software package registration is supported, as shown in FIG. the user is prompted that the supported registration is a package download, and the custom processing module registration package can be downloaded by clicking. When the user clicks to download, the custom processing module registration package is requested from the cloud server platform, the cloud server platform prepares the custom processing module registration package based on the registration request, and feeds it back to the terminal device, so as to complete the download and the registration of the custom processing module.

In an embodiment, as shown in FIG. 6, when expecting to register a custom processing module, the user clicks to determine registering the custom processing module, as shown in FIG. A registration request for the custom processing module is sent to the cloud server platform, the cloud server sends the registration request for the custom processing module to the image formation device, the image formation device queries the registration mode supported by itself based on the registration request, and feeds the supported registration mode determined by the query back to the cloud server platform, and the cloud server platform feeds it back to the terminal device. The interface shown in FIG. 5B or 5C is displayed on the terminal device to prompt the user the supported registration mode. When the link registration is supported, as shown in FIG. 5B, the user is prompted that the supported registration is a link, and the custom processing module can be registered by clicking the link. When the user clicks the link, the registration link is requested from the cloud server platform, and the cloud server platform prepares the registration link based on the link registration request, and feeds it back to the terminal device to complete the registration of the custom processing module. Alternatively, when the application software package registration is supported, as shown in FIG. 5C, the user is prompted that the supported registration is a package download, and the custom processing module registration package can be downloaded by clicking. When the user clicks download, the custom processing module registration package is requested from the cloud server platform, the cloud server platform prepares the custom processing module registration package based on the registration request, and feeds it back to the terminal device to complete the download and the registration of the custom processing module.

In an embodiment, the cloud server platform includes a first cloud server, or includes a first cloud server and a second cloud server. When the cloud server platform includes the first cloud server and the second cloud server, when expecting to register the custom processing module, the user clicks to determine registering the custom processing module, as shown in FIG. 5A. The registration request for the custom processing module is sent to the first cloud server platform module, the cloud server sends the registration request for the custom processing module request to the second cloud server, the second cloud server queries the registration mode supported by the image formation device based on the registration request, and feeds the supported registration mode determined by the query back to the first cloud server, and the first cloud server platform feeds it back to the terminal device. The interface, as shown in FIG. 5B or 5C, displayed on the terminal device to prompt the user the supported registration mode. When the link registration is supported, as shown in FIG. 5B, the user is prompted that the supported registration is a link, and the custom processing module can be registered by clicking the link. When the user clicks the link, a registration link is requested from the cloud server platform. The cloud server platform prepares the registration link based on the link registration request and feeds it back to the terminal device to complete the registration of the custom processing module. Alternatively, when the application software package registration is supported, as shown in FIG. 5C, the user is prompted to that the supported registration is a package download, and the custom processing module registration package can be downloaded by clicking. When the user clicks download, the custom processing module registration package is requested from the cloud server platform, and the cloud server platform prepares the custom processing module registration package based on the registration request, and feeds it back to the terminal device to complete the download and the registration of the custom processing module.

Figure 7A:
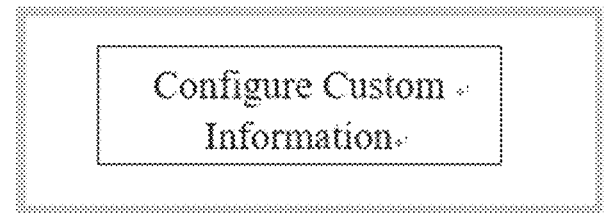
FIGS. 7A-7D are schematic diagrams of a display interface of a terminal device successfully registered a custom processing module according to an embodiment of the present disclosure.
Figure 7B:
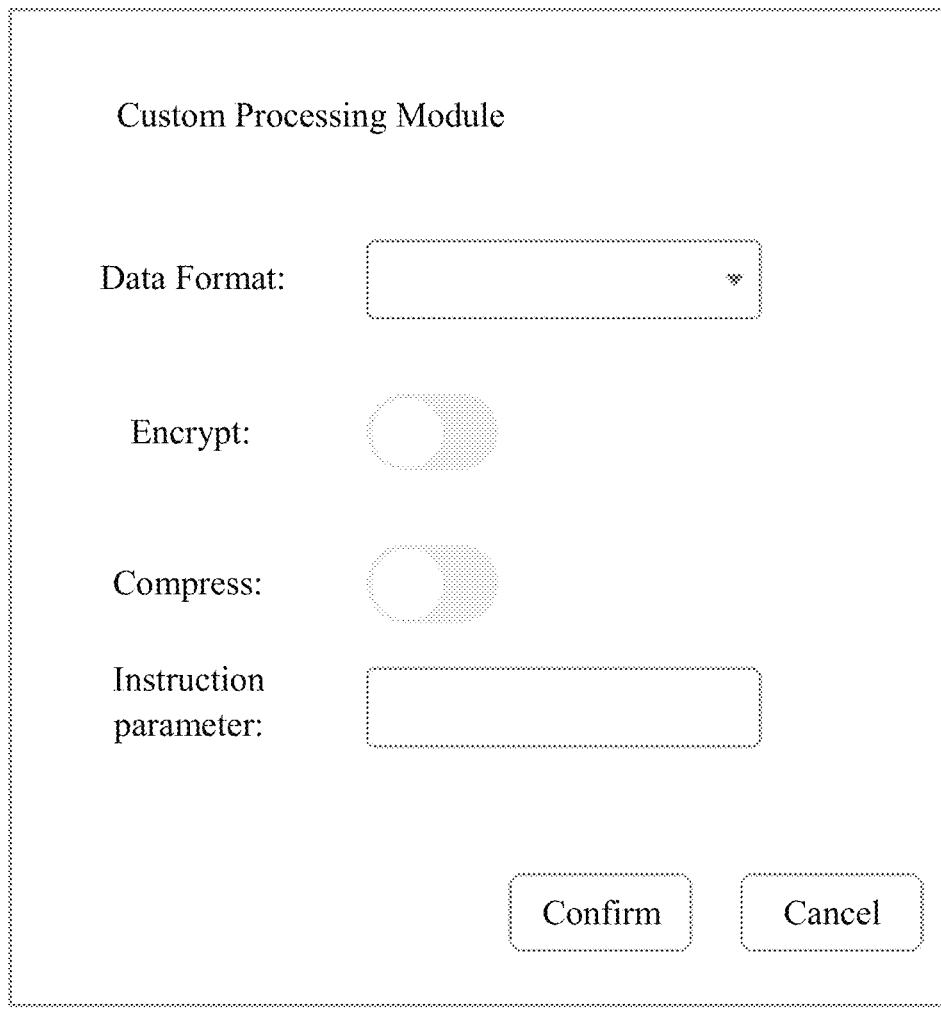

After completing the registration of the custom processing module, the schematic diagram as shown below will be displayed on the terminal device. As shown in FIG. 7A to prompt the user to configure the custom information. When the user determines to configure the custom information, the display interface shown in FIG. 7B will be further shown for users to operate related custom option settings. It should be noted that, in an embodiment, after the registration of the custom processing module is completed, the corresponding custom processing module may be an independent and complete display interface for the users to operate, or a prompt interface such as a pop-up window, or an interface including general settings and custom option settings embedded in the general setting interface, which is not limited herein, as long as the final implementation effect reflects that the custom processing module is successfully registered on the terminal device. In an embodiment, after the registration of the custom processing module is completed, the terminal device displays the custom processing interface as shown in FIG. 7B for the user to perform the setting of the custom processing option.

Figure 7C:
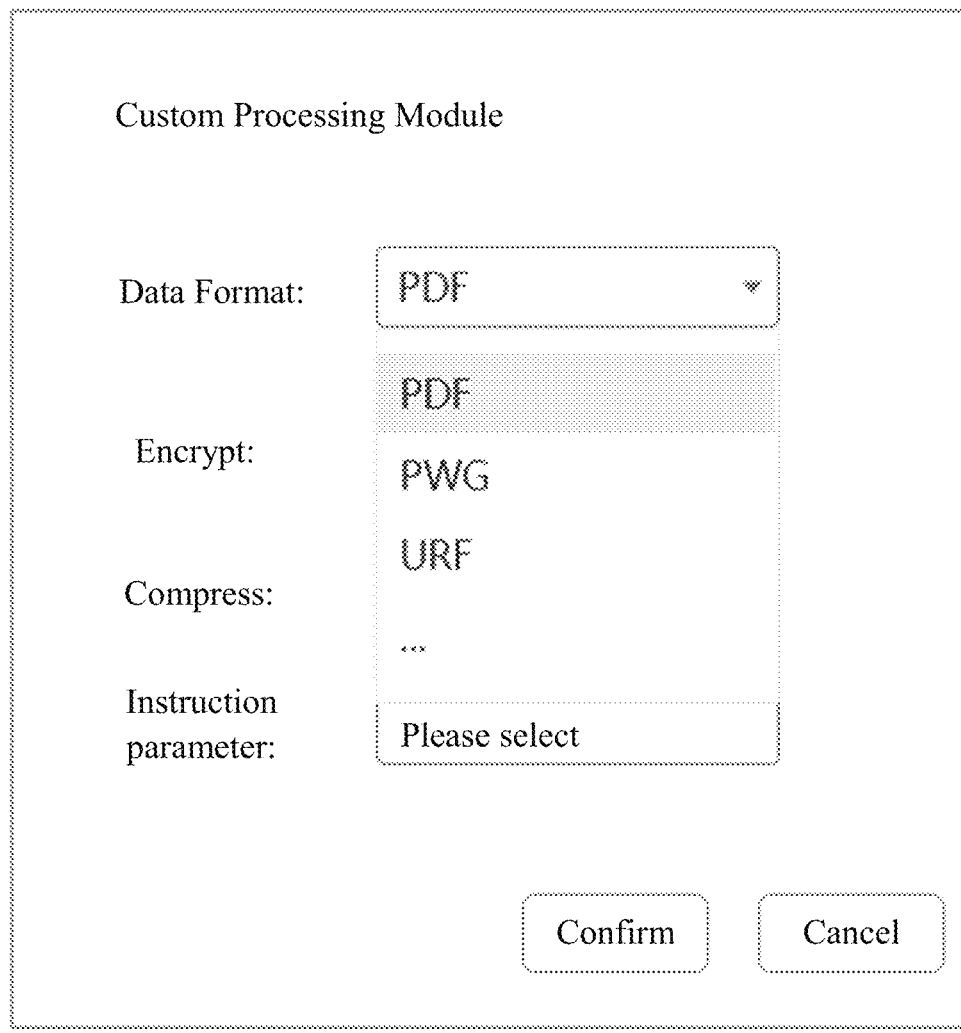
Figure 7D:
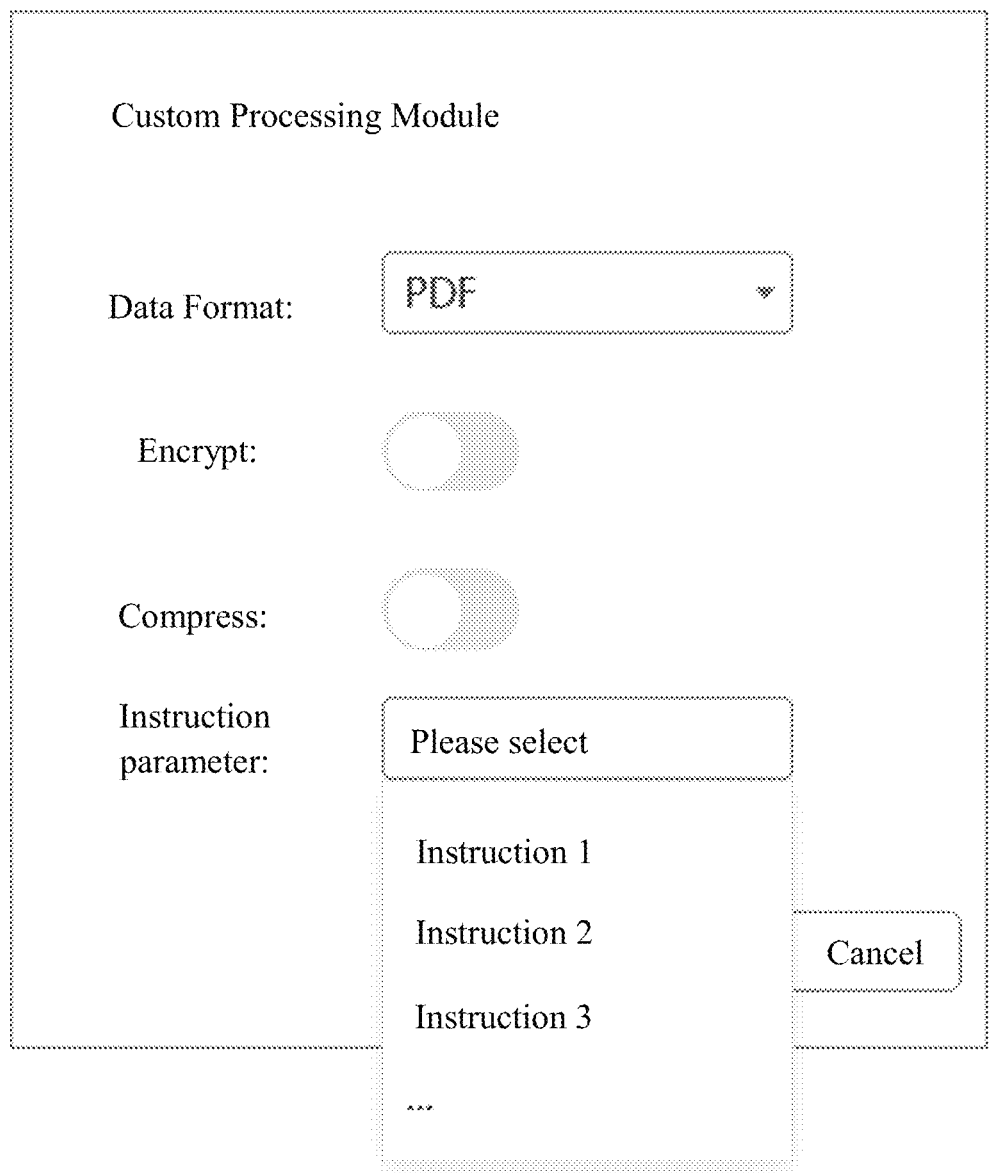

When the custom processing module registration is completed, the user can perform custom processing on the expected printout document based on the custom processing module, and the user can perform preset format conversion processing based on the custom processing module. As shown in FIG. 7c, for example, the user can set the data format to different data formats such as PDF format, PWG format and URF format. The format of the job data is converted using the preset format conversion, so as to facilitate the processing of pending job data. The user can perform adding preset instruction parameter processing based on the custom processing module. As shown in FIG. 7D, for example, the user can add instruction parameters of instruction 1, instruction 2, instruction 3, or other custom instruction parameters. The user can perform encryption processing based on the custom processing module. As shown in FIG. 7B, when expecting to perform encryption processing, the user can click to enable "Whether to encrypt" to enable the encryption. In an embodiment, after the user clicks to enable encryption, the interface can be further displayed to prompt the user to select an encryption method or to set an encryption password. In another embodiment, the encryption method is the same as the setting of the data formats and the instruction parameters, and a preset encryption method such as AES algorithm, DES algorithm and RSA algorithm, and custom encryption can be displayed for users to choose. Encryption processing of job data can enhance the security of the pending job data transmitted to the image formation device. The user can perform encoding processing based on the custom processing module. As shown in FIG. 7B, when expecting to perform the encoding processing, the use can click to enable "Whether to compress" to enable the encoding processing. In an embodiment, after the user clicks to enable encoding, the interface can also be further displayed to prompt the user to select the encoding method. In an embodiment, the encoding method is the same as the setting of the data formats and the instruction parameters, and the preset encoding method such as JBIG compression method can be displayed for the user to select. The job data is encoded and compressed, such that on the one hand the storage space of the pending job data can be reduced, and on the other hand, the transmission time of the pending job data can be shorten.

As mentioned above, an embodiment of the present disclosure provides a registering method for a custom processing module, including: sending a registration request for the custom processing module; receiving response information of the registration request for the custom processing module, and displaying a first control based on the response information; and acquiring an operation instruction, displaying a second control based on the operation instruction. The first control includes at least one information of a registration link or an application software package of the custom processing module. The second control includes a custom processing option including at least one processing option of encryption processing, encoding processing, preset format conversion processing, and adding preset instruction parameter processing.

As mentioned above, an embodiment of the present disclosure provides a registering method for a custom processing module, including: displaying a first control, and acquiring a first operation instruction based on the first control; receiving a first response information, displaying a second control based on the first response information; acquiring a second operation instruction based on the second control, and acquiring registration content corresponding to a registration mode based on the second operation instruction to register the custom processing module; and receiving a second response information, and displaying a third control. The first operation instruction includes a request instruction for custom processing module registration, or the first operation instruction is a request instruction for registration mode query. The second control including at least one of a link registration control or an application software package registration control, and the second control is configured to indicate the registration mode of the custom processing module. The second control is configured to indicate the registration mode of the custom processing module supported by the image formation device. The registration manner includes at least one of a link registration manner or an application package registration manner.

In an embodiment, a link registration link is acquired based on the second operation instruction, or a registration application software package is acquired based on the second operation instruction. The second operation instruction includes an instruction to indicate acquiring a registration link or an instruction to indicate acquiring a registration application software package.

The second response information is at least one of a registration link or a registration application software package, and the third control is a control to configure custom information. The control to configure custom information includes a custom processing option, and the custom processing option includes at least one processing option of encryption processing, encoding processing, preset format conversion processing, and adding preset instruction parameter processing.

In an embodiment, in performing the above custom processing module registration mode, the third control only includes custom information configuration instructions. Therefore, the method further includes acquiring a third operation instruction based on the third control, displaying a fourth control based on a third operation instruction. The fourth control includes a custom processing option, and the custom processing option includes at least one processing option of encryption processing, encoding processing, preset format conversion processing, and adding preset instruction parameter processing.

In an embodiment, the registration request instruction includes at least one request of acquiring a link registration request or acquiring a custom processing registration package download request. The user performs an operation based on the first control of the terminal device, and sends a request instruction for custom processing module registration to the cloud server platform. Alternatively, the registration request instruction is a query instruction for the registration mode supported by the image formation device.

In an embodiment, when the registration request instruction is a query instruction of a registration mode supported by an image formation device, or the registration request instruction includes at least one of a link registration request or a custom processing registration package download request, the response information includes the registration mode information of the custom processing module supported by the image formation device. The cloud server platform receives the registration request instruction sent by the terminal device, queries the registration mode of the custom processing module supported by the image formation device, and feeds it back to the terminal device. The terminal device requests registration content (a registration link or a registration package) of the corresponding custom processing module based on the fed-back registration request for the custom processing module, and the cloud server platform requests to prepare the custom processing application software package or the custom processing link based on the registration content (the registration link or the registration package), and responds it to the terminal device. In an embodiment, the above response information may also be the response information sent to the terminal device by the image formation device. In an example, the terminal device sends a registration request for the custom processing module to the image formation device, and the image formation device feeds back the custom processing module registration link or the custom processing module application software package supported by itself based on the request, and responds to the terminal device.

In an embodiment, when the registration request instruction includes at least one of a link registration request or a custom processing registration package download request, the response information includes at least one of a link or an application software package of the custom processing module registration. The cloud server platform receives the registration request sent by the terminal device, and prepares a custom processing application software package or a custom processing link. It can be understood that when the cloud server platform acquires one of the link or the application software package of the custom processing module registration based on the registration custom processing module request, the corresponding one of them will be responded to the terminal device. When the cloud server platform acquires the link and the application software package of the custom processing module registration based on the registration request for the custom processing module, the link and the application software package of the corresponding custom processing module registration will be responded to the terminal device. When the cloud server platform acquires the link and the application software package of the custom processing module registration based on the registration request for the custom processing module, one of the link and the application software package of the corresponding custom processing module will be responded to the terminal device. In an embodiment, the above response information may also be the response information sent to the terminal device by the image formation device. In an example, the terminal device sends a registration request for the custom processing module to the image formation device, and the image formation device prepares a custom processing module registration link or a custom processing module application software package based on the request, and responds to the terminal device.

In an embodiment, the second control may be two independent controls including a registration mode of a registration link or a registration mode of an application software package, respectively, or may be a control including one registration mode of a registration link or an application software package. Based on the second control, the user operation instruction and the custom processing module registration content (a registration link or a registration package) are acquired to register the custom processing module. When expecting to register the custom processing module through the link, the user clicks the link registration mode to acquire the registration link and register the custom processing module, and when expecting to register the custom processing module by downloading the custom processing package, the user clicks to download the custom processing module registration package, and click to perform the registration after the download is successful, so as to complete the registration of the custom processing module.

As mentioned above, the registering method for the custom processing module provided by an embodiment of the present disclosure further includes: displaying a third control based on completing the registration of the custom processing module. The third control is a configuration control to configure custom information. The custom information includes at least one of encryption processing, encoding processing, preset format conversion processing, and adding preset instruction parameter processing.

Through the registration method for the custom processing module provided by the above-mentioned embodiments of the present disclosure, when the user expects to be capable of performing the custom processing operation, the custom processing module can be registered through the above-mentioned method to realize the characteristic functions of the custom processing and satisfy user-defined special printing requirements and improve the user experience.

Figure 8:
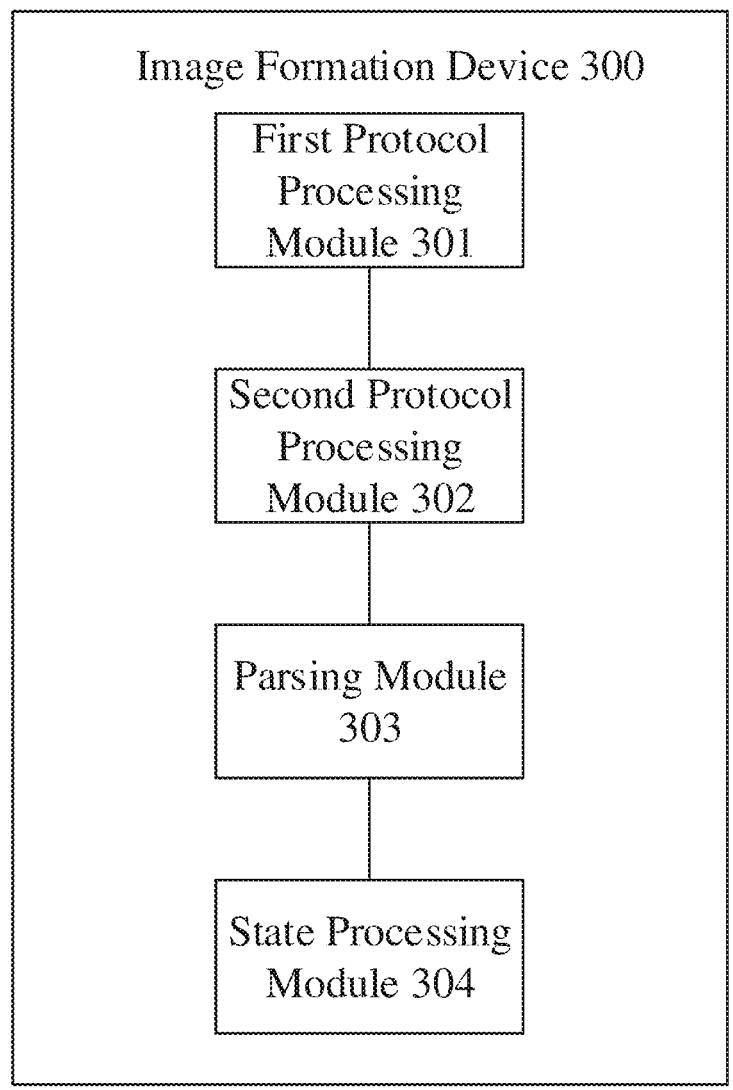
FIG. 8 is a schematic structural diagram of an image formation device according to an embodiment of the present disclosure.

As shown in FIG. 8, the image formation device 300 includes a first protocol processing module 301, a second protocol processing module 302, a parsing module 303 and a state processing module 304.

When the universal print module, the custom processing module, the communication module, the authentication module, the storage module, and the control module are provided in the first server, and the current job data includes custom data, the first protocol processing module 301 is configured to perform custom imaging processing on the pending job data transmitted by the first server.

When the universal print module, the communication module, the authentication module, the storage module and the control module are provided in the first server, the custom processing module is provided in the second server, and the current job data includes custom data, the second protocol processing module 302 is configured to perform custom imaging processing on the pending job data transmitted by the second server.

The parsing module 303 is configured to parse the pending job data to perform imaging processing on the pending job data. The state processing module 304 is configured to process the state of the image formation device 300.

An image formation control method according to the present disclosure includes acquiring the current job data and determines whether the current job data contains custom data, when the current job data includes the custom data, parsing the custom data to generate a parsing result, performing the custom processing on current job data based on the parsing result to generate pending job data, and transmitting the pending job data to the target image formation device, such that the image formation device can perform custom image formation processing on the pending job data, enrich the image formation function of the image formation device, and satisfy the user-defined special printing to improve compatibility with image formation devices.

Figure 9:
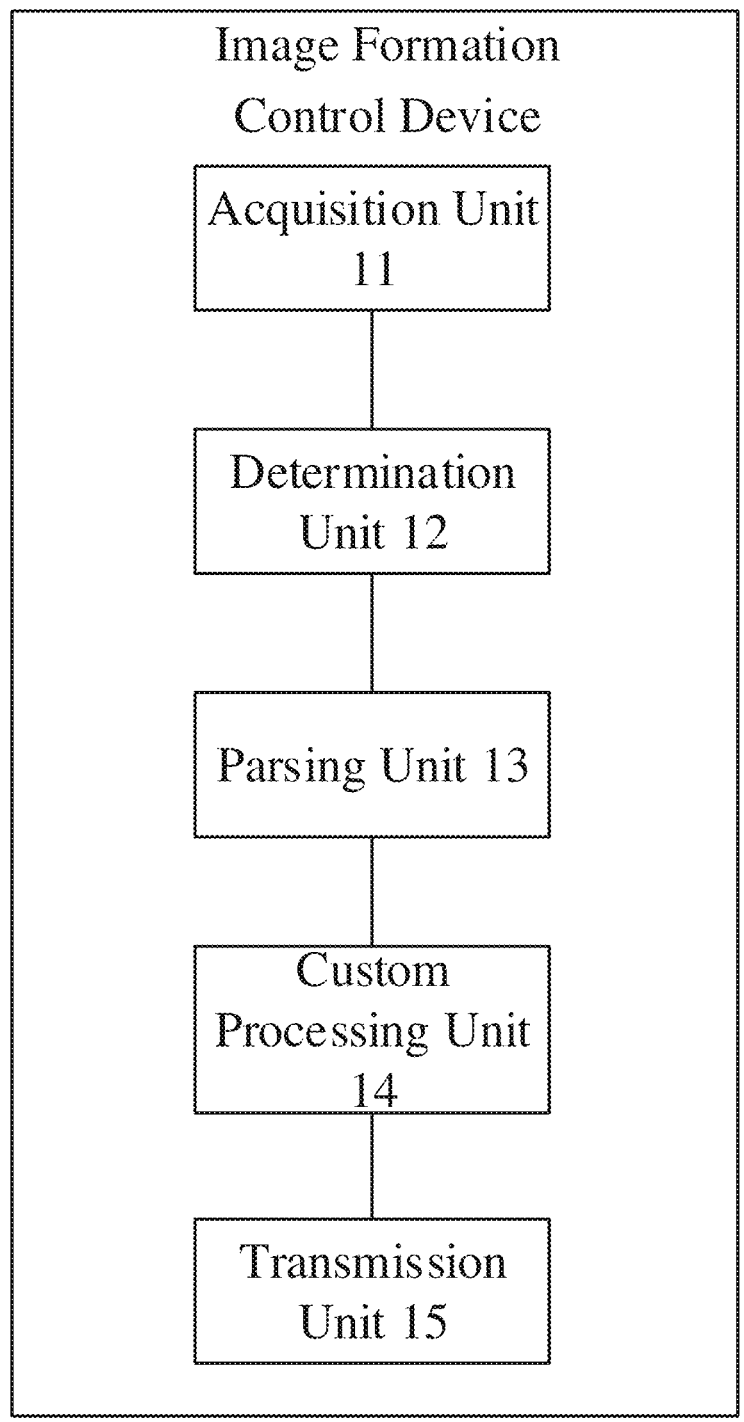
FIG. 9 is a schematic structural diagram of an image formation control device according to an embodiment of the present disclosure.

As shown in FIG. 9, an embodiment of the present disclosure further provides an image formation control device. The image formation control device includes an acquisition unit 11, a determination unit 12, a parsing unit 13, a custom processing unit 14 and a transmission unit 15. The acquisition unit configured to acquire current job data. The determination unit is configured to determining whether the current job data includes custom data. The parsing unit is configured to parse the custom data to generate a parsing result when the determination unit determines that the current job data includes the custom data. The custom processing unit is configured to perform custom processing on the current job data according to the parsing result to generate pending job data. The transmission unit is configured to transmit the pending job data to a target image formation device.

An embodiment of the present disclosure further provides an electronic device, including: a memory, a processor, and a computer program. The computer program is stored in the memory and is configured to be executed by the processor to realize the described image formation control method.

An embodiment of the present disclosure further provides a computer-readable storage medium, on which a computer program is stored, and when the program is executed, the steps of the image formation control method described above are realized.

The technical features of the above-mentioned embodiments can be combined arbitrarily. In order to make the description concise, not all the possible combinations of the technical features in the above-mentioned embodiments are described. However, any combination of these technical features shall be considered as being within the scope of the specification as long as no contradiction exists therein.

The above-mentioned embodiments only express several embodiments of the present disclosure, and the descriptions thereof are relatively specific and detailed, but shall not be construed as limitation to the scope of the invention patent. It should be noted that an ordinary person skilled in the art can make several modifications and improvements without departing from the concept of the present disclosure, which all belong to the protection scope of the present disclosure. Therefore, the scope of protection of the present disclosure patent shall be determined by the appended claims.

What is claimed is:

1. An image formation control method, comprising:
acquiring current job data, and determining whether the current job data comprises custom data, wherein the custom data comprises a preset character or a preset field;
in response to determining that the current job data comprises custom data, parsing the custom job data to generate a parsing result;
performing, by a custom processing module and according to the parsing result, custom processing on the current job data to generate pending job data, wherein the custom processing comprises at least one of encryption processing, encoding processing, preset format conversion processing or adding preset instruction parameter processing;
transmitting the pending job data to a target image formation device; and
registering a custom processing module, wherein registering the custom module comprises:
acquiring at least one of a custom processing application software package or a custom processing link; and
registering the custom processing module based on the custom processing application software package or the custom processing link.

2. The image formation control method according to claim 1, further comprising: acquiring information of the target image formation device;
wherein said transmitting the pending job data to the target image formation device comprises:
transmitting the pending job data to the target image formation device corresponding to the information of the target image formation device.

3. The image formation control method according to claim 1, further comprising:
in response to determining that the current job data does not comprises custom data, processing, by a universal print module, the current job data to generate the pending job data.

4. The image formation control method according to claim 1, further comprising: before the acquiring at least one of the custom processing application software package or the custom processing link;
sending a registration request for the custom processing module; and
receiving response information of the registration request for the custom processing module, and displaying a first control based on the response information, wherein the first control comprises at least one information of a registration link or an application software package of the custom processing module.

5. An image formation control device, comprising:
at least one processor; and
a memory configured to store instructions executable by the at least one processor, wherein the instructions cause the at least one processor to:
acquire current job data,
determine whether the current job data comprises custom data, wherein the custom data comprises a preset character or a preset field,
parse the custom data to generate a parsing result determined that the current job data comprises custom data,
perform custom processing on the current job data according to the parsing result to generate pending job data, wherein the custom processing comprises at least one of encryption processing, encoding processing, preset format conversion processing or adding preset instruction parameter processing, and
transmit the pending job data to a target image formation device,
wherein the at least one processor is configured to register a custom processing module, wherein registering the custom processing module comprises:
acquiring at least one of a custom processing application software package or a custom processing link; and
registering the custom processing module based on the custom processing application software package or the custom processing link.

6. A non-transitory computer-readable storage medium, wherein the computer-readable storage medium stores computer program instructions thereon, the computer program instructions, when being executed by a processor, are configured to:
acquire current job data, and determine whether the current job data comprises custom data, wherein the custom data comprises a preset character or a preset field;
in response to determining that the current job data comprises custom data, parse the custom job data to generate a parsing result;
perform, according to the parsing result, custom processing on the current job data to generate pending job data, wherein the custom processing comprises at least one of encryption processing, encoding processing, preset format conversion processing or adding preset instruction parameter processing; and
transmit the pending job data to a target image formation device,
wherein the processor is configured to register a custom processing module, wherein registering the custom processing module comprises:
acquiring at least one of a custom processing application software package or a custom processing link, and
registering the custom processing module based on the custom processing application software package or the custom processing link.

7. The non-transitory computer-readable storage medium according to claim 6, the processor is further configured to:
acquire information of the target image formation device;
wherein said transmit the pending job data to the target image formation device comprises:
transmit the pending job data to the target image formation device corresponding to the information of the target image formation device.

8. The non-transitory computer-readable storage medium according to claim 6, the processor is further configured to:
in response to determining that the current job data does not comprises custom data, process the current job data to generate the pending job data.

9. The non-transitory computer-readable storage medium according to claim 6, the processor is further configured to:
send a registration request for the custom processing module; and
receive response information of the registration request for the custom processing module, and display a first control based on the response information, wherein the first control comprises at least one information of a registration link or an application software package of the custom processing module.

\* \* \* \* \*